United States Patent
Tripp et al.

(10) Patent No.: US 7,406,422 B2
(45) Date of Patent: Jul. 29, 2008

(54) TECHNIQUES FOR IMPROVING COLLABORATION EFFECTIVENESS

(75) Inventors: Travis S. Tripp, Fort Collins, CO (US); Steve Yonkaitis, Fort Collins, CO (US); David W. Kamholz, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 857 days.

(21) Appl. No.: 10/894,508

(22) Filed: Jul. 20, 2004

(65) Prior Publication Data
US 2006/0020457 A1    Jan. 26, 2006

(51) Int. Cl.
*G10L 21/00* (2006.01)
*G10L 17/00* (2006.01)

(52) U.S. Cl. .................. 704/275; 704/270.1; 704/251; 704/246; 709/218; 709/203; 709/228

(58) Field of Classification Search ......... 704/270–275, 704/246, 231, 251; 379/52, 88.06, 88.1, 379/202, 1; 709/218, 203, 205, 204
See application file for complete search history.

(56) References Cited

U.S. PATENT DOCUMENTS

| | | | |
|---|---|---|---|
| 5,384,772 A * | 1/1995 | Marshall | 370/235 |
| 5,515,491 A * | 5/1996 | Bates et al. | 715/754 |
| 5,764,735 A * | 6/1998 | Thorner | 379/93.07 |
| 6,041,301 A * | 3/2000 | Fado et al. | 704/270 |
| 6,192,395 B1 * | 2/2001 | Lerner et al. | 709/204 |
| 6,418,125 B1 * | 7/2002 | Oran | 370/266 |
| 6,600,725 B1 * | 7/2003 | Roy | 370/261 |
| 6,603,774 B1 * | 8/2003 | Knappe et al. | 370/466 |
| 6,618,702 B1 * | 9/2003 | Kohler et al. | 704/250 |
| 6,782,363 B2 * | 8/2004 | Lee et al. | 704/248 |
| 6,934,756 B2 * | 8/2005 | Maes | 709/227 |
| 2003/0125954 A1 * | 7/2003 | Bradley et al. | 704/270 |
| 2003/0220798 A1 * | 11/2003 | Schmid et al. | 704/276 |
| 2004/0172252 A1 * | 9/2004 | Aoki et al. | 704/270 |
| 2006/0200345 A1 * | 9/2006 | Kooiman | 704/233 |

* cited by examiner

Primary Examiner—Vijay B Chawan

(57) ABSTRACT

A computer-implemented method, in a given computer, of identifying at least one current speaker among at least three participants of a network-based collaborating system. The participants collaborate using a plurality of computers. The method includes receiving a first speech event signal at the given computer, the first speech event signal being generated by a first computer of the plurality of computers, the first speech event signal being generated responsive to voice input by a user of the first computer. The method further includes identifying, using the given computer and responsive to the receiving the first speech event signal from the first computer, to a user of the given computer an identity of a user of the first computer as a first current speaker.

9 Claims, 5 Drawing Sheets

TECHNIQUES FOR IMPROVING COLLABORATION EFFECTIVENESS

BACKGROUND OF THE INVENTION

Network-based collaboration tools (NCTs) have been employed to increase collaboration effectiveness among geographically dispersed team members. Netmeeting® from Microsoft Corporation of Redmond, Wash. (www.microsoft.com) and WebEx® by the WebEx Communications, Inc. of San Jose, Calif. (www.webex.com) are examples of such network-based collaboration tools.

While NCTs allow collaborators to conduct a teleconference and share software applications via their computers, certain aspects of current NCT products can be improved. For one, many users find the current NCT products lacking in user-friendliness. For example, it is sometimes impossible to identify during a teleconference who is speaking at any particular time. While some participants may be able to identify the identity of a speaker from the sound of his or her voice, participants who are new to the group may not be able to do so. If a participant is unable to identify the current speaker, the context of what is said is often lost to the listener. The problem is often exacerbated when multiple participants speak simultaneously. In this case, it is often impossible, even for those familiar with the participants, to ascertain who is speaking.

The same issue exists with respect to shared software applications. Some NCTs allow a participant to share multiple software applications and/or documents with other participants. For example, a participant A can share documents M and N (via two separate windows on his computer screen) with a participant B. That same participant A may also share a document X (via another window) with a participant C, and a document Y (via yet another window) with a participant D.

If participant A cannot ascertain whether participant B or participant D is currently speaking, participant A may not know which window among multiple windows present on his display terminal to focus on in order to follow along with the discussion. While participant A can always interrupt to clarify the identity of the speaker, such interruption is often unwelcome, disrupts the flow of the discussion, often to the annoyance of the current speaker and other participants.

SUMMARY OF INVENTION

The invention relates, in an embodiment, to a computer-implemented method, in a given computer, of identifying at least one current speaker among at least three participants of a network-based collaborating system (NCS). The participants collaborate using a plurality of computers. The method includes receiving a first speech event signal at the given computer, the first speech event signal being generated by a first computer of the plurality of computers, the first speech event signal being generated responsive to voice input by a user of the first computer. The method further includes identifying, using the given computer and responsive to the receiving the first speech event signal from the first computer, to a user of the given computer an identity of the user of the first computer as a first current speaker.

In another embodiment, the invention relates to a computer-implemented method of identifying on a display terminal associated with a given computer an application window associated with a current speaker among windows associated with participants of a network-based collaborating system (NCS). The participants include at least three participants collaborating using a plurality of computers. The method includes receiving a first speech event signal at the given computer, the first speech event signal being generated by a first computer of the plurality of computers, the first speech event signal being generated responsive to voice input by a user of the first computer. The method further includes ascertaining, using the given computer, that the first speech event signal is associated with the first computer using data associated with the first speech event signal. The method additionally includes identifying, using the given computer and responsive to the ascertaining, the application window associated with the first computer, thereby identifying to a user of the given computer the application window as a window employed to collaborate with the user of the first computer.

In yet another embodiment, the invention relates to an arrangement in a given computer for identifying at least one current speaker among at least three participants of a network-based collaborating system (NCS). The participants collaborate using a plurality of computers. The arrangement includes an event listening module configured for receiving a first speech event signal at the given computer, the first speech event signal being generated by a first computer of the plurality of computers. The first speech event signal is generated responsive to voice input by a user of the first computer and for identifying, using the given computer and responsive to the receiving the first speech event signal from the first computer, to a user of the given computer an identity of the user of the first computer as a first current speaker.

In yet another embodiment, the invention relates to an arrangement for identifying at least one current speaker among at least three participants of a network-based collaborating system (NCS). The participants collaborate using a plurality of computers. The arrangement includes speech event generating means configured for generating a first speech event signal at a first computer of the plurality of computers, the first speech event signal being generated by the first computer responsive to voice input by a user of the first computer. The arrangement further includes speech event listening means at a second computer of the plurality of computers. The speech event listening means is configured for identifying, responsive to the first speech event signal from the first computer, to a user of the second computer an identity of the user of the first computer as a first current speaker.

These and other features of the present invention will be described in more detail below in the detailed description of various embodiments the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

The present invention will now be described in detail with reference to various embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with embodiments of the present invention, there are provided arrangements and methods for allowing participants of network-based collaboration system (NCS) to quickly identify the current speaker or speakers. Furthermore, embodiments of the invention flag and/or activate windows associated with the current speaker, thereby enabling a participant to quickly focus on applications relevant to the current speaker.

Figure 1:
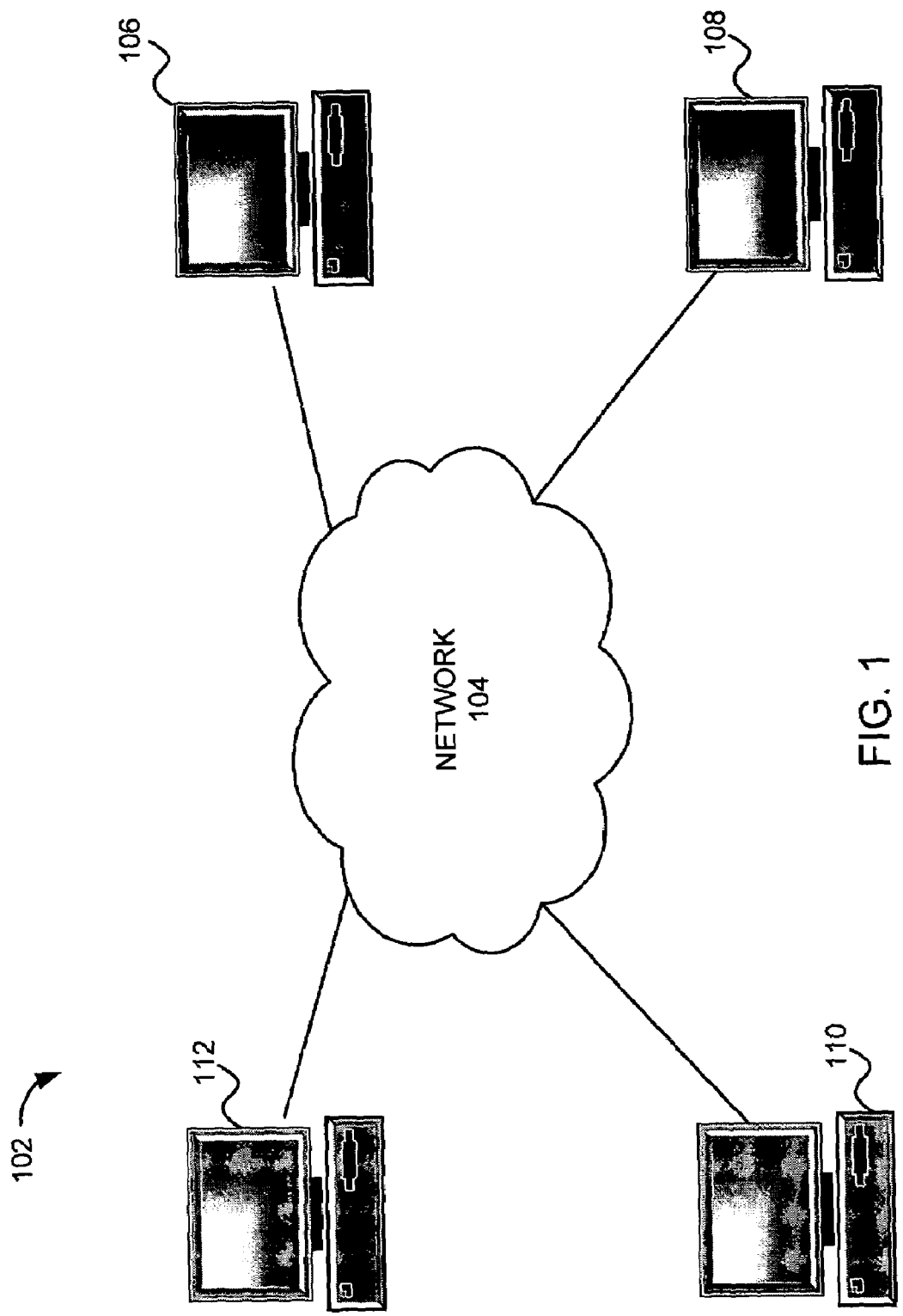
FIG. 1 shows, in accordance with an embodiment of the invention, a network-based collaboration system (NCS), including a computer network and a plurality of computers.

The features and advantages of the invention may be better understood with reference to the figures and drawings that follow. FIG. 1 shows, in accordance with an embodiment of the invention, a network-based collaboration system (NCS) 102 including a network 104 and a plurality of computers 106, 108, 110, and 112. Computers 106, 108, 110, and 112 may represent, for example, laptop computers, palm-top computers, desk-top computers, and the like. Through computers 106, 108, 110, and 112, users can exchange voice and digital data (such as applications and electronic documents).

Network 104 may represent a packet-based network, such as the Internet. In an implementation, voice conversations are carried using the packet-based network, employing technologies such as voice-over-IP (VOIP). In another implementation, network 104 may also include a circuit-based network, such as a telephone network commonly known as plain old telephone network or POTS. In this implementation, voice data is carried using the circuit-based network while digital data is carried using the packet-based network.

Irrespective whether network 104 is purely packet-based, circuit-based, or a combination of packet-based and circuit-based, a participant's computer, such as computer 106 typically includes or interfaces with a transducer (e.g., a microphone) to receive that participant's voice input and another transducer (e.g., a speaker) to output voice from other participants.

Generally speaking, when a participant joins the collaboration session, there is a registration procedure. The registration procedure is intended to inform the other participants that this particular participant has joined. Thus, for example, a participant John Smith may be asked to pronounce his name into his computer (e.g., computer 106) or to type in his name upon joining, signifying that he is signing into the collaboration session. The fact that John has registered may then be made known to other participants.

In an embodiment, a database at a host computer (e.g., computer 112 that has been designated as a host) may store the registration information pertaining to all participants. This registration information may include, for example, the identity of the participant (whether in textual, graphical, or audible form) and the computer with which the participant is associated. In another embodiment, the registration information may be broadcast to all participants and stored locally at the participants' computers, with no computer acting as the host.

Figure 2:
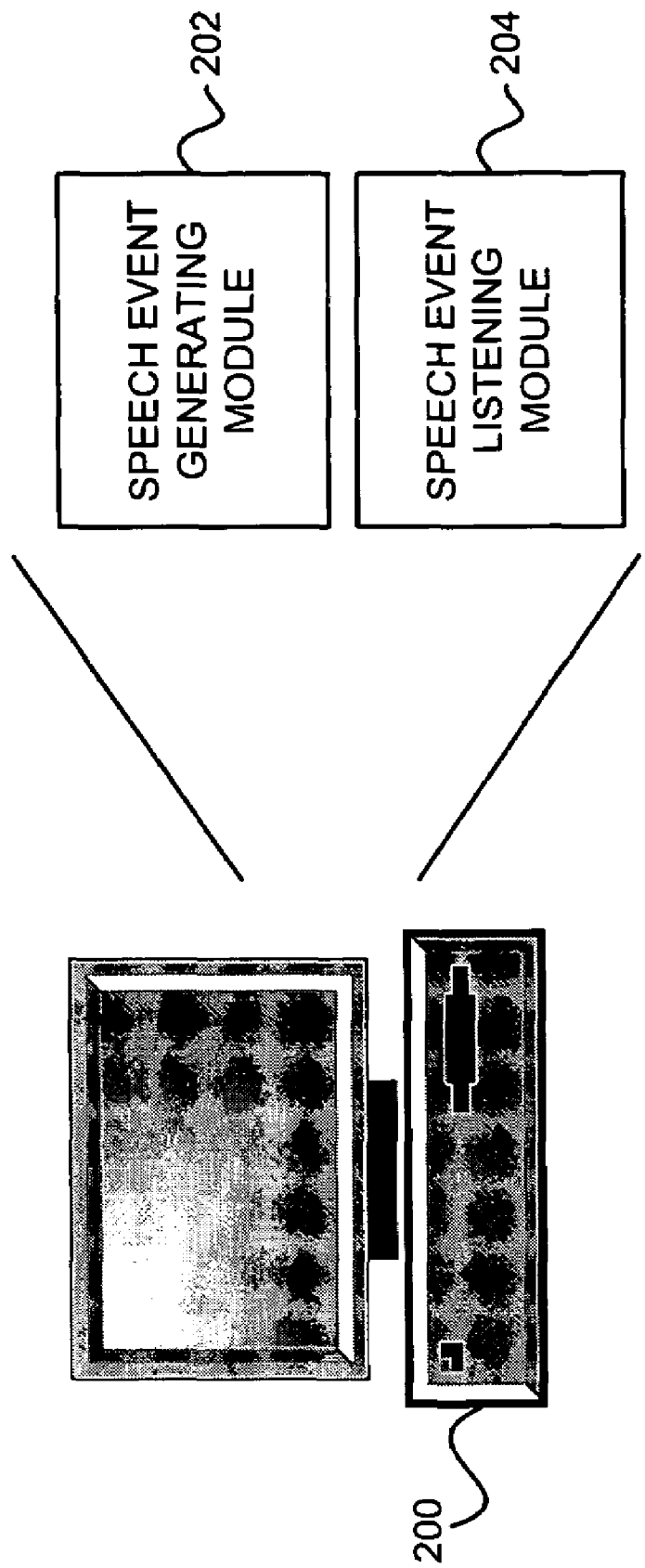
FIG. 2 shows, in accordance with an embodiment of the invention, a speech event generating module and a speech event listening module in a participant's computer.

With reference to FIG. 2, there are provided a speech event generating module 202 and a speech event listening module 204 in each participant's computer 200. These modules may be implemented using software and/or hardware. Speech event generation module 202, in an embodiment, detects whether the participant is speaking. The detection may be based on the amplitude of the signal received from the microphone transducer (i.e., whether it exceeds a predefined threshold), and/or may be based on other more sophisticated analog and/or digital signal processing techniques. These signal processing techniques may include, for example, filtering, dynamic thresholding, and/or pattern recognition.

Once the speech event generating module 202 associated with John's computer determines that John has begun to speak, it generates a speech event signal which is then transmitted to all other participants' computers, either directly or via a host computer arrangement as an intermediary. The speech event signal includes identification information which identifies which computer the speech event signal is sent from. In an embodiment, the speech event signal also includes the speaker's identity, although such information can also be ascertained from the registration database once the identity of the computer from which the speech signal event is sent is known.

With reference to FIG. 1, if John is associated with computer 106, the generated speech event signal is transmitted from computer 106 to computers 108, 110, and 112. The speech event is received and acted upon by speech event listening modules 204 disposed at each of computers 108, 110, and 112.

For example, the speech event listening module 204 at computer 108 would detect that a speech event has been received, and would ascertain from the data associated with the received speech event that the user of computer 106 has just spoken. Computer 108 would then resolve, using the registration information furnished by John when he registered, to identify that it is John who has just spoken. This information is then conveyed to Sally, the user of computer 108 for example. The information may be conveyed visually (e.g., by displaying a pre-stored picture of John, displaying John's name, highlighting John's name in the list of participants, etc.). The information may also be conveyed audibly, e.g., by temporarily muting Sally's microphone and by pronouncing John's name using a computer-synthesized voice, for example). This approach may be suitable for visually-impaired participants. Still, other forms of notification involving the visual, audible and/or tactile sense may be employed. The user-interface aspect of the notification may be user-configurable to improve usability, in an embodiment.

The speech event is also received by computers 110 and 112, causing John to be identified as the current speaker to users of computers 110 and 112. If the user of computer 110, Michael, for example, also speaks, the speech event generating module associated with computer 110 likewise generates a speech event signal that is then transmitted to the other computers (e.g., computers 112, 106 and 108). The users associated with these other computers 106, 108, and 112 would be informed by their computers that the user of computer 110, i.e., Michael, is currently speaking. Thus, multiple participants may be identified simultaneously as the current speakers if these multiple participants speak simultaneously.

In an embodiment, when John stops speaking, the speech event generating module 202 in computer 106 may generate another speech event signal that informs all other computers that the user of computer 106 has stopped speaking. Generally speaking, a configurable delay may be imposed before such "stop" speech event is generated and transmitted to avoid spuriously generating and sending out the "stop" speech event. This "stop" speech event then causes the other computers to cease identifying John as the current speaker. Thus this embodiment contemplates the generation and transmittal of a "start" speech event signal when the participant starts to speak, and the generation and transmittal of a "stop" speech signal when the participant stops speaking. In an alternative embodiment, there may be only a single type of speech event generated and transmitted, and their receipt toggles the state of the associated participant between "currently speaking" and "not currently speaking." Generally speaking, speech events from a particular computer would only be sent in succession if there is a pause greater than a configurable duration to avoid generating the speech event signals spuriously.

In another embodiment, the generated speech event signal is also employed to identify the collaboration window associated with the current speaker. With reference to FIG. 1, suppose that Sally currently shares two documents with John and a separate application with Michael, and three other documents with Peter, the user of computer 112, for example. Thus, there are at least six separate collaboration windows on Sally's display terminal. At any given time, only one of those collaboration windows is in the foreground and/or being designated as "active."

When John starts to speak, a speech event signal is generated by the speech event signal generating module associated with computer 106. This speech event signal is received by Sally's computer 108. Sally's computer 108 may then ascertain from the data associated with the received speech event signal that the user of computer 106 is currently speaking. From this, Sally's computer 108 would identify or highlight or activate the collaborating application window that is employed to facilitate collaboration between itself (i.e., computer 108) and the computer that generated the received speech event signal (i.e., computer 106 in this case). Thus the application window employed to collaborate with John would be identified, highlighted, or activated on Sally's display terminal. Since Sally currently shares two documents with John, at least one or both application windows associated with these two documents may be brought to the foreground, identified and/or highlighted.

In an embodiment, if there are multiple applications windows to be identified (either because the current speaker John is sharing multiple applications or documents with Sally or because multiple speakers such as John and Michael are currently speaking), only one application window may be "activated" or become the focus. Other application windows may simply be highlighted or visually indicated in some manner that they are associated with the current speaker(s). In this case, this identification still allows Sally to more quickly select the window associated with the current speaker of interest since only the application windows associated with the current speaker(s) are highlighted.

Figure 3:
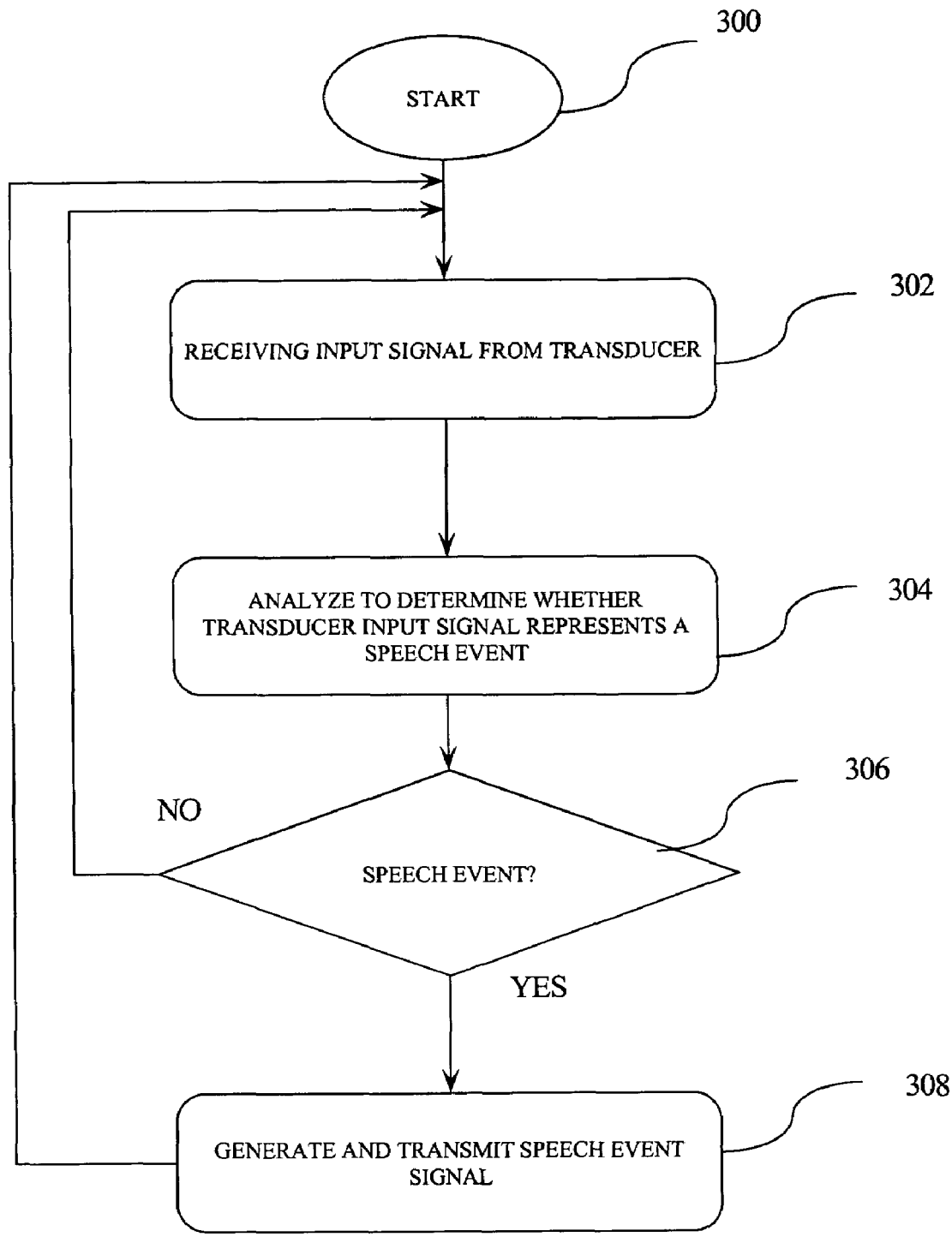
FIG. 3 shows, in accordance with an embodiment of the present invention, the steps for generating a speech event signal.

FIG. 3 shows, in accordance with an embodiment of the present invention, the steps for generating a speech event signal. The method starts at 300. In step 302, a signal from the participant's transducer (e.g., microphone) is received. In step 304, the signal is analyzed to determine whether the input represents a speech event by the user (e.g., whether the user is speaking or whether the transducer is only receiving background noise). Background noise level may be measured in advance before the speaker starts speaking or may be obtained through digital signal processing techniques, for example. As mentioned, the cessation of speech may also represent a speech event and may cause the generation of a "stop" speech event signal if the previous speech event reflects the participant's speaking. If the transducer signal reflects a speech event (ascertained in 306), an appropriate speech event signal is generated and transmitted (308) to computers associated with other participants. Thereafter, the method returns to step 302 to continue to receive and analyze the signal from the participant's transducer. On the other hand, if the input does not represent a speech event (such as in the case with background noise), the method returns to step 302 to continue to receive and analyze the signal from the participant's transducer.

Figure 4:
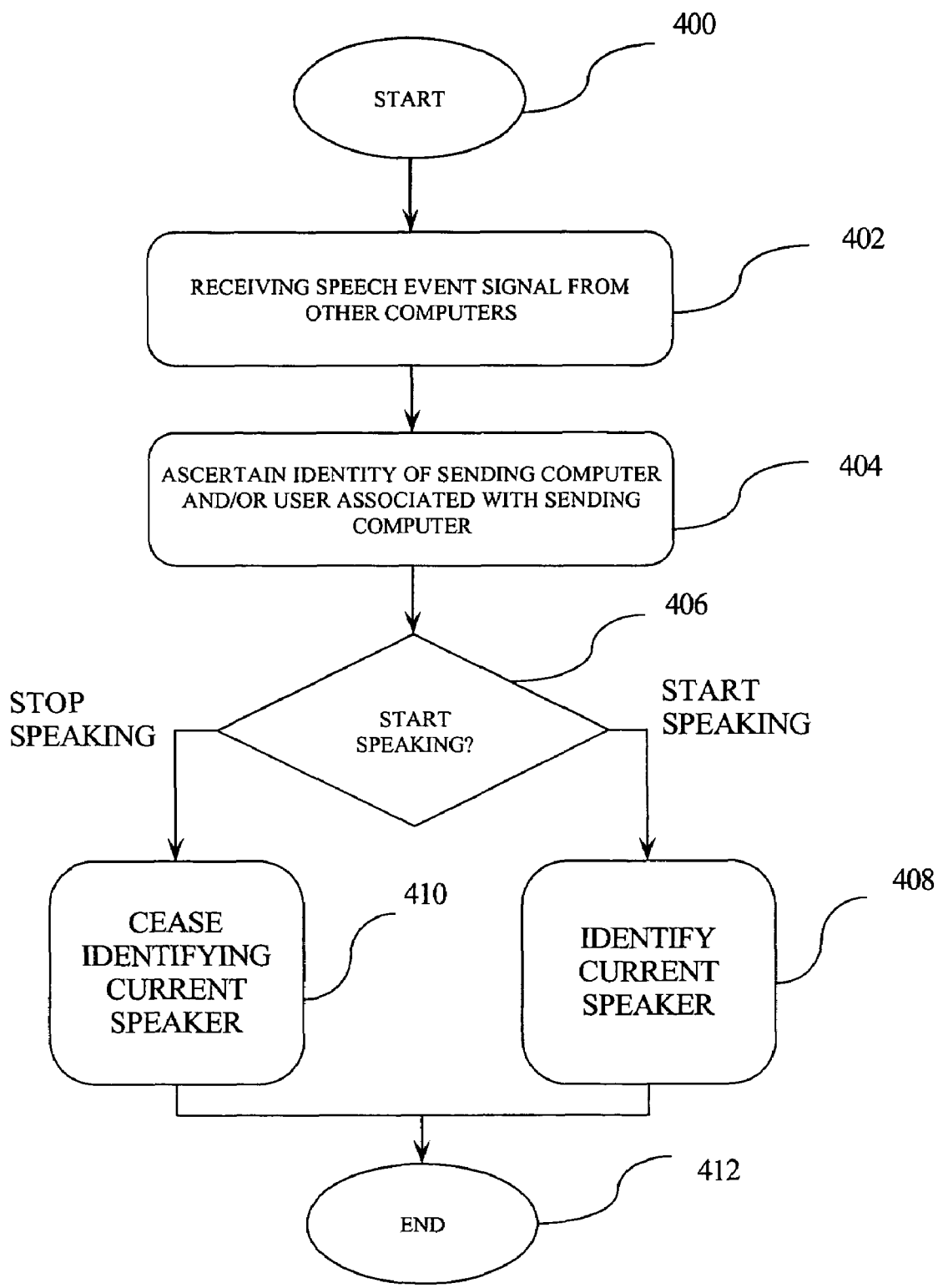
FIG. 4 shows, in accordance with an embodiment of the present invention, the steps for identifying a current speaker responsive to a received speech event signal.

FIG. 4 shows, in accordance with an embodiment of the present invention, the steps for identifying a current speaker responsive to a received speech event signal. In step 402, a speech event signal is received. As discussed, this speech event signal is generated by another computer associated with another participant. The received speech event signal is then analyzed (step 404) to ascertain the identity of the computer that generates the received speech event signal and/or the user associated with the computer that generates the received speech event signal. If the speech event signal indicates that the participant associated with the other computer is speaking (decision block 406), the identity of the current speaker is identified on the display screen (step 408). On the other hand, if the speech event signal indicates that the participant has stopped speaking, that participant is no longer identified on the display screen as the current speaker (step 410). The method ends at step 412.

Figure 5:
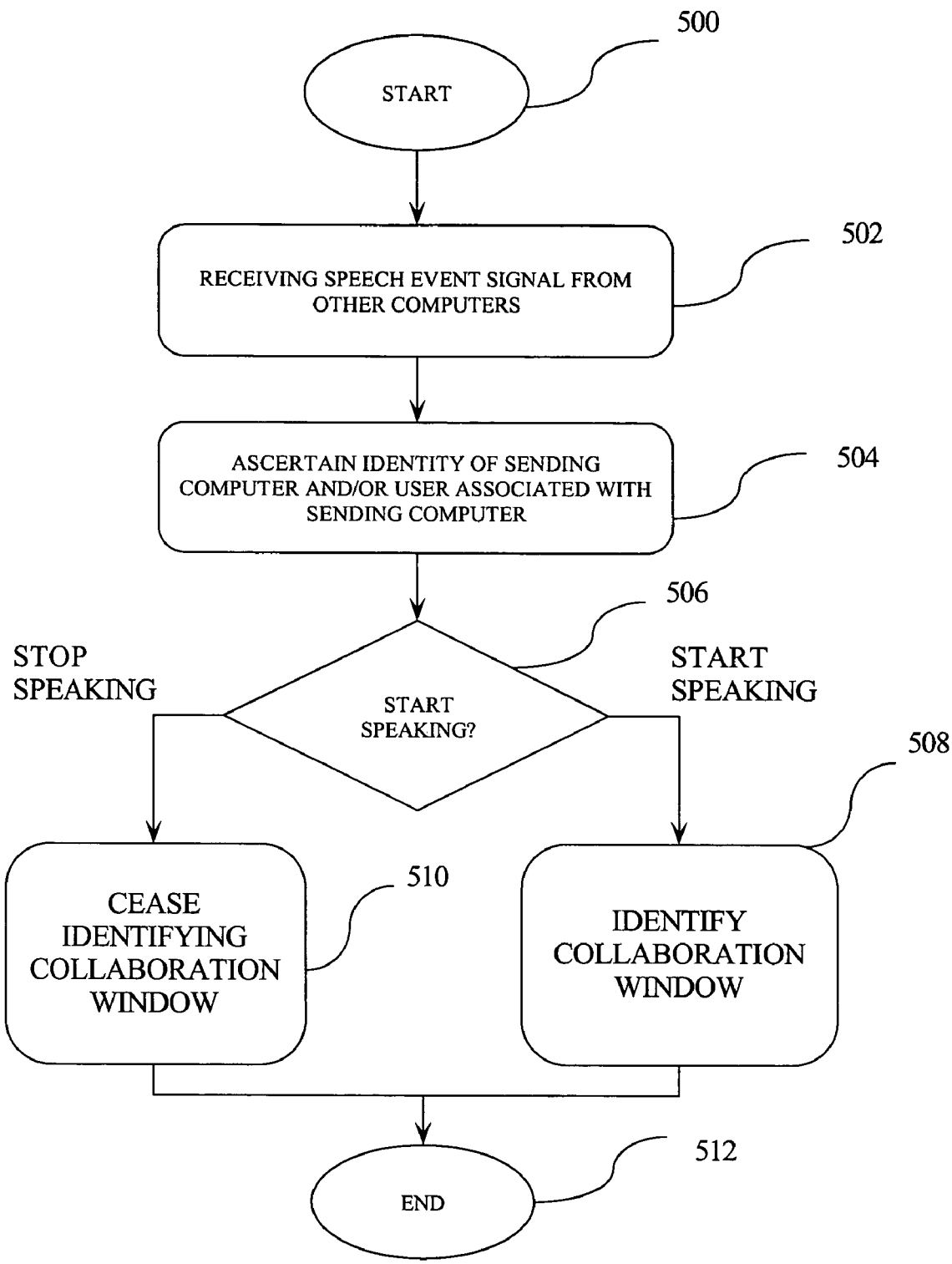
FIG. 5 shows, in accordance with an embodiment of the present invention, the steps for identifying a collaboration window associated with the current speaker.

FIG. 5 shows, in accordance with an embodiment of the present invention, the steps for identifying a collaboration window associated with the current speaker. This identification is, as mentioned, responsive to a received speech event signal. In step 502, a speech event signal is received. As discussed, this speech event signal is generated by another computer associated with another participant. The received speech event signal is then analyzed (step 504) to ascertain the identity of the computer that generated the received speech event signal and/or the user associated with the computer that generates the received speech event signal.

If the speech event signal indicates that the participant associated with the other computer is speaking (decision block 506), the application window associated with the computer that generates the received speech event signal is identified on the display screen (step 508). As mentioned, identification may include bringing the window to the foreground, highlighting, and/or activating. On the other hand, if the speech event signal indicates that the participant has stopped speaking, that application window is no longer identified on the display screen as being associated with the current speaker (step 510). The method ends at step 512.

As can be appreciated from the foregoing, embodiments of the invention permit a user to quickly ascertain the identity of the current speaker even if the user does not personally know the current speaker and cannot recognize the current speaker by the sound of his voice. If there are multiple speakers, they can be identified simultaneously. Furthermore, application windows associated with the current speaker are automatically identified and/or brought to the foreground, allowing the user to quickly access and/or review the data associated with these application windows.

While this invention has been described in terms of several embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a given computer, a computer-implemented method of identifying on a display terminal associated with said given computer an application window associated with a current speaker among windows associated with participants of a network-based collaborating system, said participants including at least three participants collaborating using a plurality of computers, comprising:

receiving a first speech event signal at said given computer, said first speech event signal being generated by a first computer of said plurality of computers, said first speech event signal being generated responsive to voice input by a user of said first computer;

ascertaining, using said given computer, that said first speech event signal is associated with said first computer using data associated with said first speech event signal; and identifying, using said given computer and responsive to said ascertaining, said application window associated with said first computer, thereby identifying to a user of said given computer said application window as a window employed to collaborate with said user of said first computer.

2. The method of claim 1 wherein said identifying said identity of said application window includes bringing said application window to the foreground of said display terminal.

3. The method of claim 1 wherein said speech event signal is generated by said first computer when an amplitude of said voice input exceeds a predefined threshold.

4. The method of claim 1 wherein said first speech event signal is transmitted from said first computer to said given computer via a packet-based network.

5. The method of claim 4 wherein voice from said user of said first computer is transmitted from said first computer to said given computer via a circuit-based network.

6. The method of claim 1 wherein voice from said user of said first computer and said first speech event signal are transmitted from said first computer to said given computer via a packet-based network.

7. The method of claim 1 wherein data pertaining to said identity of said user of said first computer is received from said user of said first computer during registration.

8. The method of claim 1, wherein, at said given computer, there are first and second application windows associated with the current speaker among windows associated with the participants of the network-based collaborating system, the method comprising:

identifying, using said given computer and responsive to said ascertaining, said first application window associated with said first computer by bringing said first application window to the foreground of said display terminal; and identifying, using said given computer and responsive to said ascertaining, said second application window associated with said first computer by highlighting said second application window on said display terminal without bringing said second application window to the foreground of said display terminal.

9. The method of claim 1, wherein, when said first speech event signal has been generated responsive to voice input by the user of said first computer, the method further comprising:

deactivating speech input devices provided with all others of said plurality of computers besides said first computer, wherein the deactivating step is maintained until it is determined that the user of said first computer has finished speaking.

* * * * *